July 12, 1932.     O. E. ANDRUS     1,867,345

METHOD OF REPAIRING TOOLS BY WELDING

Filed March 3, 1930

INVENTOR.
Orrin E. Andrus
BY
ATTORNEY.

Patented July 12, 1932

1,867,345

UNITED STATES PATENT OFFICE

ORRIN E. ANDRUS, OF WAUWATOSA, WISCONSIN, ASSIGNOR TO A. O. SMITH CORPORATION, OF MILWAUKEE, WISCONSIN, A CORPORATION OF NEW YORK

METHOD OF REPAIRING TOOLS BY WELDING

Application filed March 3, 1930. Serial No. 432,788.

The present invention relates to a method of repairing tools and more particularly to a method of repairing tools by welding.

An object of the invention is to provide a method of repairing tools which prevents the tool from becoming overheated.

A further object of the invention is to provide a method of welding broken high speed tools without injury to the tools.

The invention may be best understood by referring to the accompanying drawing in which.

Figure 1:
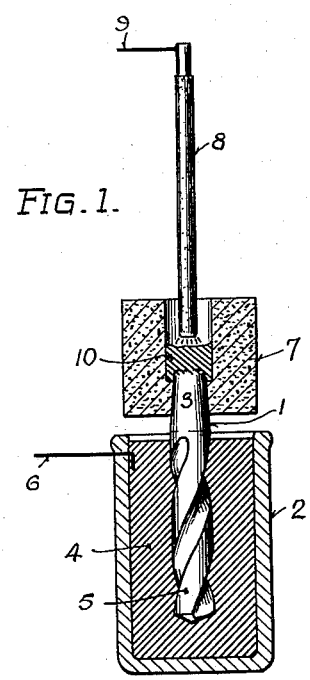
Figure 1 is a longitudinal sectional view of an assembly for repairing tools in accordance with an embodiment of the invention.

The possibilities of injuring tools while repairing them are twofold. The first is that of injury by faulty clamping, and the second is that of injury by excessive heating which destroys the temper. The first is most likely to occur while trying to avoid the second. If the clamping is defective, the contact will be insufficient to accommodate the current, and the tool will be burned. Conversely, if the clamp is broad enough to cover a large portion of the tool, the tool may be of such a shape that there is likelihood of injuring it by the clamping means.

The present invention also corrects another defect in the method of repairing tools in which clamps are used, by conducting heat from the tools uniformly and efficiently, thereby preventing overheating and removal of hardness.

The tool 1 to be repaired is placed in a suitable open mold 2, preferably in a vertical position and equidistant from the sides and bottom of the mold. The broken shank 3 of the tool extends above the mold 2. Molten metal 4, such as lead, tin, babbitt or the like, is poured into the mold 2, submerging the tool steel portion 5 of the tool. The molten metal 4 is then permitted to solidify thus embedding the tool in a solid block of metal and thereby clamping the tool.

Electrical contact is established with the mold 2 or with the metal 4 in the mold through the cable 6 which is connected to a suitable source of electricity.

The tool 1 may be repaired by arc, butt, or flash welding. If the first is used (Figure 1) a suitable mold 7 of carbon or the like is preferably supported about the broken shank 3. A fusible metallic weldrod 8, which is connected with the second lead 9 of the source of electricity, is then touched to the end of the broken shank 3 and quickly withdrawn a short distance to establish an electric arc between the shank and the weldrod. The weldrod 8 fuses away and fills the mold with deposited metal 10 which solidifies and becomes an integral part of the shank 3. The metal 10 may be machined or ground to the desired size and shape.

Figure 2:
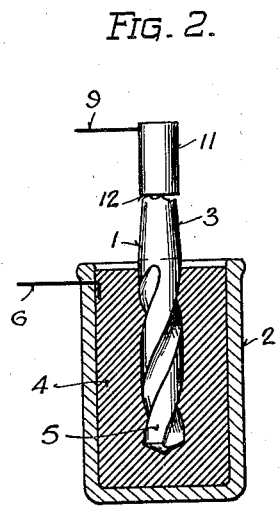
Fig. 2 is a similar view showing a modified application of the invention.
Figure 3:
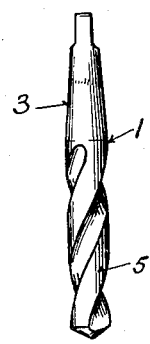
Fig. 3 is a view of the repaired tool.

If the butt welding process is used (Fig. 2), electrical contact is established with the repair shank 11 through a lead 9. The repair shank 11 and the broken shank 3 are placed in firm contact. The resistance at the joint 12 is so great that the ends of the parts to be welded reach a welding temperature, and pressure is applied to cause the parts to be fused together.

A similar method referred to above as flash welding may be employed. This method is perhaps to be preferred to butt welding where the broken shank 3 is ragged. The current is supplied in the same manner. The repair shank 11 is touched to the broken shank 3 and is quickly withdrawn to establish an electric arc across the joint 12. The arc fuses away the high spots of the ragged end of the broken shank 3 and when the parts have reached a welding temperature, pressure is applied to force the parts together.

After cooling, the surface of the welded shank 3 may be ground down to reduce any burr that may have been formed in the upsetting operation.

During the welding process, the heat generated is transmitted in part to the tool steel portion 5 of the tool 1. However, the solid block of lead or like metal 4 conducts the heat away with sufficient rapidity to prevent the tool steel portion 5 from becoming overheated. There is little resistance between the tool and its lead enclosure and therefore practically no heat is developed by reason of the contact therebetween.

The lead or other metal 4 conducts the heat away to prevent overheating by conduction. It prevents heating by offering little resistance to the flow of current. It further serves as a clamping means for holding the tool during the repairing operation.

Any suitable material may be employed instead of lead, provided it is an electrode material capable of conducting electricity and heat to meet the requirements specified.

Various embodiments within the scope of the invention may be used, and I do not limit myself to the specific procedure set forth.

I claim:

1. A method of repairing tools which comprises embedding a portion thereof in a solid electrode material which will fuse at a temperature that is low relative to the temperature which will change the temper of the tool, and welding the unconfined portion thereof to a quantity of repair metal.

2. A method of repairing tools which comprises embedding a portion thereof to be protected in a solid electrode material having a melting temperature which is low as compared to the detempering temperature of the tool, and leaving the portion to be repaired unconfined, and welding a quantity of metal to the portion to be repaired.

3. A method of repairing tools having a tempered portion which comprises embedding the tempered portion in a soft metal, leaving the broken portion unconfined, and welding a quantity of metal to the unconfined portion.

4. The method of repairing tools which comprises inserting a portion of a tool to be repaired into a mold containing molten soft metal, causing the soft metal to solidify, establishing electrical contact with repair metal and the unconfined portion of the tool, causing the repair metal to contact with the unconfined portion, thereby establishing a circuit through the parts to be welded and thereafter welding the same.

5. The method of repairing tools having a tempered portion which comprises inserting the tempered portion in molten soft metal, causing the soft metal to solidify, and thereafter welding repair metal to the unconfined portion of the tool by means of an electric current.

6. The method of welding repair metal to the shank of a tool which comprises embedding the portion of the tool away from the shank in soft metal, establishing electric current between the shank and the repair metal and welding the same together into a unitary structure.

7. The method of welding repair metal to the broken shank of a tool which comprises embedding the portion of the tool away from the shank in plastic electrode material, causing the electrode material to solidify and confine the portion away from the shank, establishing electric current between the shank and the repair metal and welding the same together into a unitary structure.

8. In the process of welding repair metal to the shank of a tool, the steps which comprise embedding the portion of the tool away from the shank in a solid electrode material which softens at a temperature below that at which the tool is detempered, and establishing electrical contact with the tool through said material as an electrode.

9. The process of repairing a tool by welding parts thereto comprising, embedding the tool part to be welded in a solid material which will support the tool part during the performance of a welding operation, said material having capacity to conduct electricity and to make good electrical contact with the tool part, welding a predetermined quantity of metal to the tool part, and applying heat to the supporting material to effect the release of the tool.

In testimony whereof I have signed my name at Milwaukee, Wisconsin, this 28 day of February, 1930.

ORRIN E. ANDRUS.